March 2, 1965 J. A. STARK 3,171,663
MACHINE TOOL CHUCKING DEVICE
Filed July 15, 1960 3 Sheets-Sheet 1
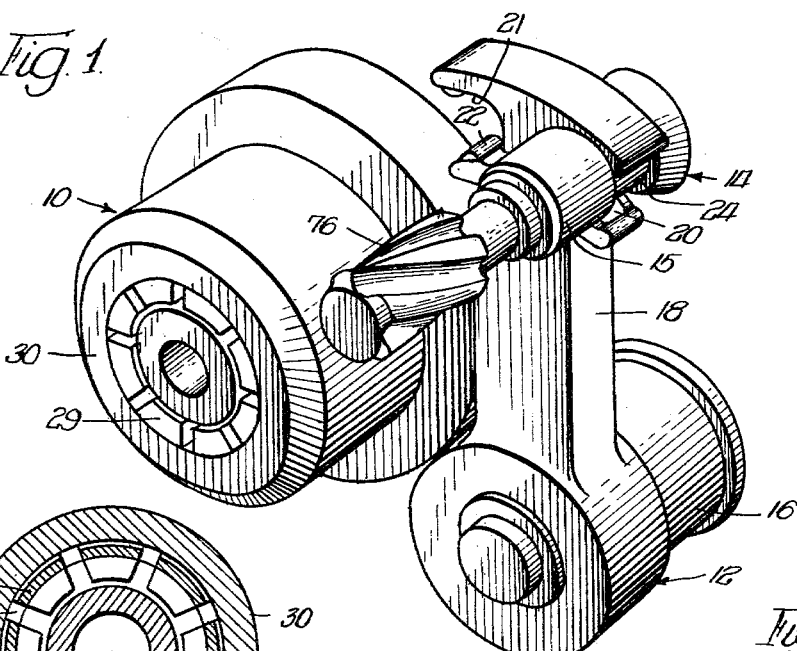
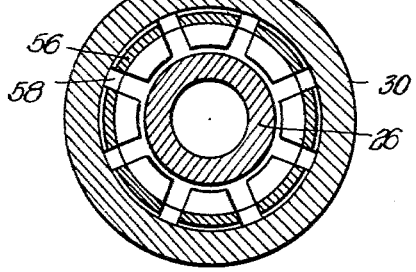
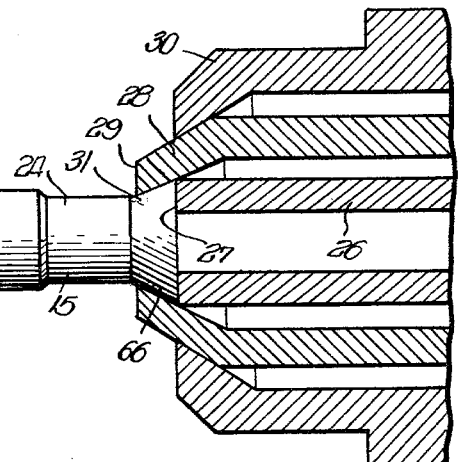
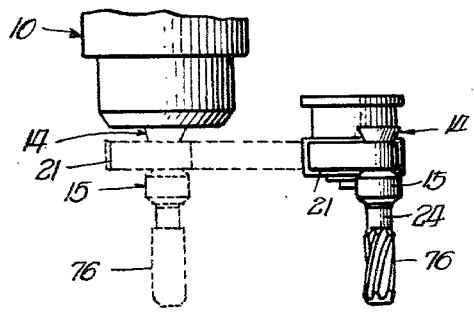
INVENTOR.
James A. Stark,
BY
Byron, Hume, Groen + Clement
attys March 2, 1965  J. A. STARK  3,171,663
MACHINE TOOL CHUCKING DEVICE
Filed July 15, 1960  3 Sheets-Sheet 2
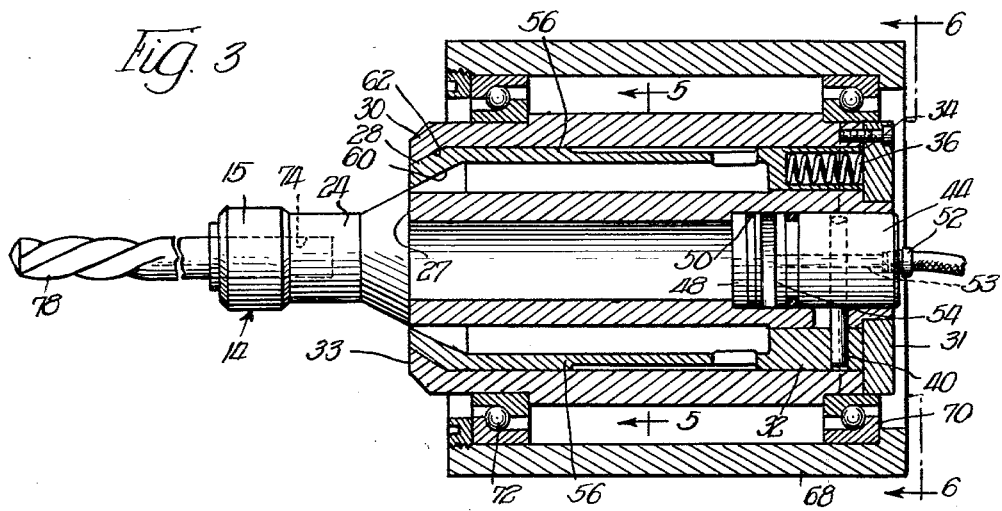
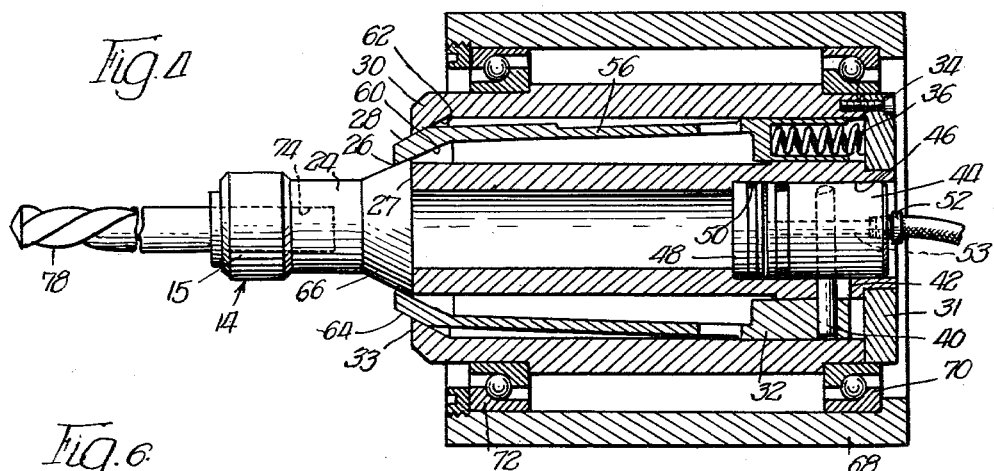
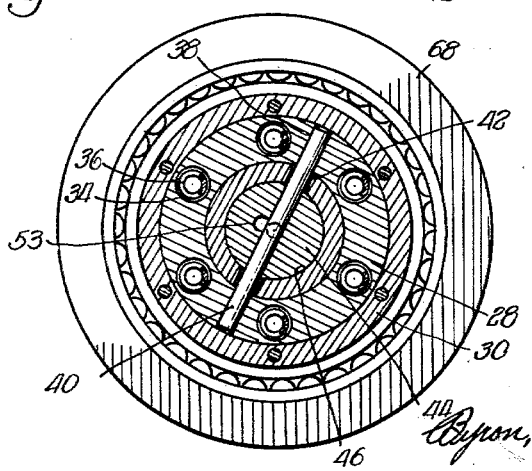
INVENTOR.
James A. Stark,
BY
Byron, Hume, Groen + Clement
Attys.

March 2, 1965 J. A. STARK 3,171,663
MACHINE TOOL CHUCKING DEVICE
Filed July 15, 1960 3 Sheets-Sheet 3
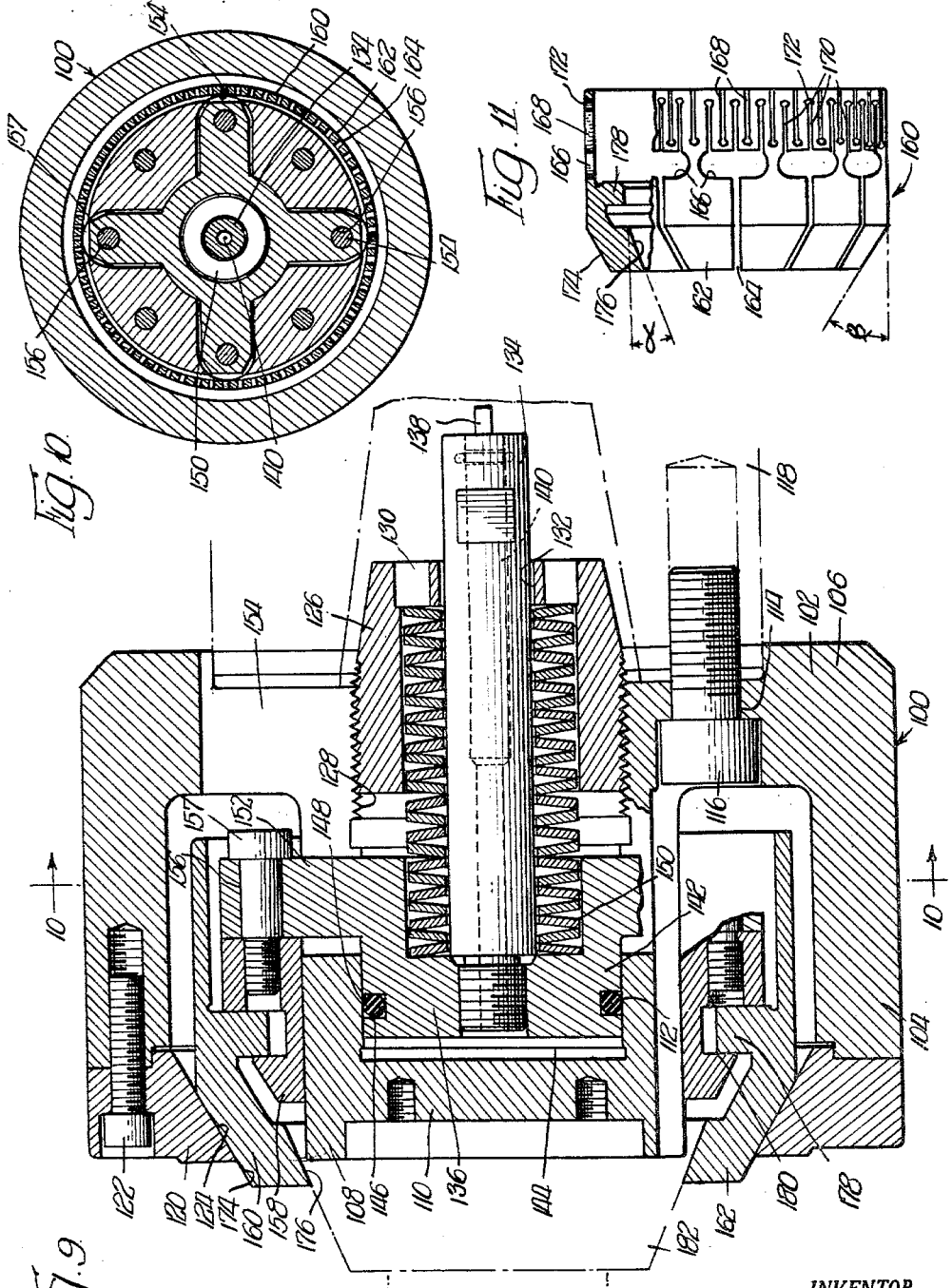
INVENTOR.
James A. Stark,
BY
Byron, Hume, Groen & Clement
attys

United States Patent Office

3,171,663
Patented Mar. 2, 1965

3,171,663
MACHINE TOOL CHUCKING DEVICE
James A. Stark, 4846 Central Ave., Western Springs, Ill.
Filed July 15, 1960, Ser. No. 43,097
14 Claims. (Cl. 279—4)

This invention broadly relates to machine tools and in particular to a chucking device that is especially adapted to be used in conjunction with automatic machine tools with which a plurality of implements of different types and sizes may be utilized. The invention further relates to a unique tool or implement holder that may be used in conjunction with the aforementioned chucking device.

In the past few years numerous advances have been made in the field of machine tools. One significant advance was the utilization of stored data to control the machine during its operation. Of course, one form of stored data are the well known punched cards or tapes which are read by a scanning device which in turn transmits the information received from the card to a control mechanism. These machines have been highly successful since they minimize the personnel necessary for the operation of the machine and thus economize on labor costs, and at the same time greatly increase production.

Another advance in the field of automatic machine tools is the development of a machine which can utilize a large number of machining implements which are automatically interchangeable. Such machines normally include a magazine in which implements of various sizes and types are stored and a means for conveying the implements between the magazine and the machine in which they are held. The means for conveying the implements by way of example could include a pickup device which can be controlled by signals sent from the card scanning device mentioned previously.

One of the problems encountered in constructing a machine which will utilize a large number of implements is the design of a chuck which will lend itself to this use. Heretofore chucks have generally included a collet composed of a plurality of annularly spaced fingers which are adapted to receive the end of the tool. After the tool has been inserted into the collet, the latter is then forced radially inward in order to grasp the tool and hold it against rotary movement relative thereto. This type of chuck requires that the tool be brought from the magazine, which is generally spaced laterally thereof, and then inserted into the annulus formed by the fingers. Thus it can be seen that the implement must be moved in at least two directions in order to place it in the chuck. The change in direction complicates the transfer mechanism and also requires a greater time to complete the transfer.

As a result of this problem I have invented a chuck which eliminates the necessity of inserting the implement in the collet. In other words, as will be seen hereinafter, it is merely necessary to move the implement in only a single direction or plane. As a matter of fact, the implement need merely be "wiped" across the face of the chuck by the tool changer until it is approximately centered at which time the chuck is actuated while the tool is held stationary so that the latter is grasped. The tool changer may then be moved out of the way so that the implement is ready for use in the manner desired.

The invention also includes a unique tool holder that is especially adapted to be used with the chucking device.

An important feature and object of this invention resides in the provision of a chuck that eliminates the necessity of inserting the tool into the collet.

A second feature and object of the invention resides in the provision of a chucking device that requires the implement to be moved in only a single plane in order to be placed in grasping position.

Another feature and object of the invention resides in the provision of a chuck that may be utilized in conjunction with numerous machine tool implements.

Another feature and object of the invention resides in the provision of a chucking device that may be utilized in conjunction with conventional machine tools and does not require any substantial alteration thereof.

Another feature and object of the invention resides in the provision of a chuck that provides at least the grasping strength and concentricity of the devices known heretofore in addition to all of the features set forth above.

A still further feature and object of the invention resides in the provision of a tool holder that is especially adapted to be used in conjunction with the aforementioned chuck.

The invention or a part thereof will be referred to hereinafter for purposes of convenience, as a chucking device or chuck, but it will be understood that it is actually a work holder in that it may be used for holding tools such as drills, mills, taps and the like, or for holding stock such as in a lathe. For this reason the name chucking device or chuck is not to be construed as a limitation as to the use of the invention. Furthermore the name toolholder is not to be construed as a limitation to the invention since it might be used for holding objects other than tools, and could be referred to as a workpiece or a workpiece holder.

These and other objects and features of the invention will be apparent upon reading of the specification with reference to the following drawings.

In the drawings:
FIGURE 1 is a perspective of the chucking device embodying the invention and one form of a tool changer that may be used in conjunction therewith.

FIGURE 2 is a fragmentary view in section of the chucking device shown in FIGURE 1 with a tool holder and tool mounted thereon.

FIGURE 3 is a sectional view of the chucking device when the collet is in a retracted position.

FIGURE 4 is a sectional view of the chucking device showing a collet in its extended or grasping position.

FIGURE 5 is a sectional view taken along the line 5—5 in FIGURE 3.

FIGURE 6 is a sectional view taken along the line 6—6 in FIGURE 3.

FIGURE 7 is a plan view of the chucking device and a tool changer to illustrate that the changing operation may be carried out in one plane.

FIGURE 8 is a schematic illustration of the operation of the collet and the sleeve 30.

FIGURE 9 is a cross sectional view of another embodiment of the invention taken along the lines 9—9 in FIGURE 10.

FIGURE 10 is a cross sectional view taken along the lines 10—10 in FIGURE 9; and FIGURE 11 is a view partly in section and partly in elevation of a collet used in the construction of the embodiment shown in FIGURES 9 and 10.

For purposes of convenience in describing the invention, the terms "chuck" and "tool holder" shall be used at various times hereinafter. It will be understood that the use of such terms, however, is merely by way of example and convenience and is not to be construed as a limitation. For purposes of defining the invention the term "chuck" shall include any work holder, and the term "tool holder" shall include any work piece such as a tool which is to be held by the work holder.

Referring now to FIGURE 1, there is shown a preferred form of the chucking device or chuck, generally denoted by the numeral 10. The chucking device 10 may be constructed of any suitable material or materials which have the properties such as strength, hardness, and the like, necessary to serve in the capacity for which they are designated. For example, the parts of the chucking device may be constructed of metal such as steel or brass.

A schematic illustration of an implement transmitting device is also shown in FIGURE 1 and generally denoted by the numeral 12. The implement transmitting device 12 or "changer" as it will be called hereinafter, is adapted to select a machine tool implement 14 mounted in the holder 15 from a magazine (not shown) positioned adjacent the chuck and to transmit the tool 14 to the chucking device and at the same time remove the implement previously used, so that the new implement may be properly positioned. The changer 12 may be controlled in any suitable manner such as by means of signals generated by a data scanner which in turn is actuated by a data storing means such as a punched card.

In this instance the changer 12 consists of a spindle 16 which is rotatably mounted and an arm 18 having the arcuate slots or recesses 20 and 21. The recesses 20 and 21 are provided with a grasping means such as the springs 22 and are equipped to embrace the holder 15 in the annular groove 24. The springs 22 resiliently hold the holder 15 at the grooves 24 during the transmission operation but release it once it has been fixed in the chuck.

The chucking devices 10 may be used in conjunction with most conventional types of machine tools and is adapted to be mounted in some conventional manner to a drive means (not shown) so as to drive the machine tool implement. It will be apparent later on that various types and sizes of tools may be used with the chuck 10 such as drills, end mills, reamers, taps and the like, as well as stock such as in a lathe.

The chuck 10 as shown in FIGURES 2, 3 and 4 includes a spindle 26 and a collet 28 which circumvents and is coaxial with the former. The spindle 26 and collet 28 are mounted within the sleeve 30 which is secured by means of the plate 31 to the spindle 26. The collet 28 as will be explained in detail hereinafter is adapted to be reciprocated with respect to both the spindle 26 and the sleeve 30 so that the forward end 29 thereof when in extended position projects beyond the end 27 of the spindle 26, as shown in FIGURES 2 and 4. Conversely, when the collet 28 is in its retracted position, the forward end thereof 29 is substantially flush with the end 27 of the spindle 26 as can be seen in FIGURES 1 and 3.

The collet 28 consists of the annular portion 32 which is mounted in sliding relationship on the spindle 26 and is adapted to abut on the plate 31 when it is in retracted position. A plurality of longitudinally directed recesses 34 are spaced about the annular ring 32 open to the plate 31. A coil spring 36 is disposed in each of the recesses 34 and is confined therein by means of the plate 31. The coil springs 36 force the collet 28 in the extended position, as shown in FIGURE 4.

The annular ring 32 is provided with the opposed recesses 38 which receive the pin member 40. The pin member 40 extends through the opposed slots 42 in the wall of the spindle 26. The slots 42 are elongated to permit the longitudinal movement of the pin 40 during the reciprocation of the collet 28. The pin 40 also projects through the piston 44 which is disposed in the bore 46 of the spindle 26 so that the collet 28 is longitudinally fixed with respect to the piston.

The bore 46 is closed at one end by means of the cap 48 and seal assembly 50. The other end of the bore 46 is provided with the pressure fitting 52 which is adapted to receive pressurized fluid from some suitable source such as a compressor or the like. The pressure fitting 52 is connected to a passage 53 which extends through the piston 44 so that the high pressure fluid is received within the chamber 54 formed by the end of the piston and the cap 48. The high pressure fluid in the chamber 54 forces the piston to the right, which in turn carries with it the collet 28 against the force of the springs 36. In this manner the collet 28 is moved from the extended position shown in FIGURE 4 to the retracted position shown in FIGURE 3.

It will be apparent that the relationship of the spring assemblies and the piston may be reversed so that the collet 28 may be forced into its retracted position by means of a centrally located spring. In that case the collet would be forced into its extended position by the application of high pressure fluid to it directly or to a piston attached thereto. It is further apparent that fluid pressure motors may be used exclusively for reciprocating the collet 28 so that the spring assemblies may be eliminated. As a matter of fact, other means may be used in lieu of the fluid motors and springs.

Secured to the annular ring 32 and extending forwardly therefrom are a plurality of fingers 56. As can be seen in FIGURE 5, the fingers 56 are regularly spaced in an annular pattern about the spindle 26 and are normally radially spaced therefrom. Intermediate the adjacent fingers are the spaces 58 which are sufficiently large to permit radial contraction of the fingers during the grasping of an implement or tool holder, as will be seen later on.

The fingers 56 are provided with the inner tapered surfaces 60 which converge toward and are adjacent to the end 33 of the chuck. The tapered surfaces 60 diverge at the angle $\alpha$ from the horizontal which will be explained in detail later on.

The sleeve 30 is provided with the inner tapered surface 62 which converges toward and is adjacent to the end 33 of the chuck 10. The fingers 56 are provided with the surfaces 64 which are complementary to the surface 62. The surfaces 62 and 64 diverge from the horizontal at the angle $\beta$.

In the preferred embodiment the angles $\alpha$ and $\beta$ are nonlocking angles. By nonlocking angles is meant that a vertical force (in this instance a radial force) will cause at least one of the surfaces to slip with respect to its mating surface. The slippage is the result of the fact that when the radial force is divided into its vectors, normal and parallel to the mating surface, the product of the former multiplied by the coefficient of friction between the two surfaces is less than the latter. In such case the parallel force tending to cause the surfaces to slide with respect to each other is greater than the frictional force tending to prevent such sliding. In a steel-on-steel relationship with smooth finishes, the nonlocking angles begin at approximately 16 degrees. It is to be noted that the angle at which nonlocking begins is determined by several factors, some of which are finish, the lubricant, if any, the types of metals or materials involved, as well as certain other factors which may have some minor effect on the frictional characteristics of one or both of the surfaces.

The surfaces 60, 62 and 64 are such that the angle $\beta$ is greater than angle $\alpha$. It is to be noted that the difference between $\beta$ and $\alpha$ determines whether the fingers 56 or collet 28 lock in the extended position or not, without being held by some positive force. If the difference is in the locking range, then once the collet 28 has been moved into its extended position so as to grasp the tool holder, it is no longer necessary to provide a positive force in order to hold it in that position.

Thus, in one preferred embodiment where the angular difference is within the locking range, once the collet has been extended to grasp the tool holder, then the force could be released until it was desired to retract the collet so as to release the tool holder. Of course, it is assumed that during the period in which the collet 28 is extended, there is no substantial force from some extraneous source such as a spring, urging it into its retracted position. It is to be noted that when the collet 28 is locked in its extended position without the aid of positive force, it has approximately the same grasping ability as when with such force.

A second embodiment of the chuck contemplates a construction where the difference between $\beta$ and $\alpha$ is within the nonlocking range. The operation of the chuck would be exactly the same as described previously, with the exception that it would be necessary to provide a positive means for holding the collet 28 in its extended position. Once the positive means were released, the collet 28 would then tend to retract of its own accord so as to release the tool holder.

As pointed out previously, the angle $\beta$ is normally considerably larger than the angle $\alpha$. One example of a chuck includes an angle $\alpha$ of 24 degrees and an angle $\beta$ of 30 degrees, so that the difference between the two is 6 degrees which is in the locking range.

When the collet 28 is forced forwardly, it can be seen that the fingers 56 are forced to contract radially by the co-operation of the tapered surfaces 62 and 64. The extension of the fingers 56 causes the surfaces 60 to be displaced inwardly so that the lines of projection intersect the center line closer to the spindle 26 as shown in FIGURE 8. The greater the extension the closer the point of intersection. The greater the difference between the two angles the greater the rate of change of the point of intersection. As a matter of fact, if the angles are equal, or surfaces 60 and 64 are parallel, there will be no change in the point of intersection. The change in point of intersection causes the surface 60 to grasp the frusto-conical end 66 of the tool holder 15. This grasping action fixes the tool holder 15 against rotary movement so that it may be driven by the chuck 10. As long as the angle $\alpha$ at the time of full extension is in the nonlocking range, the horizontal vector derived from the force transmitted from the fingers 56 will be sufficient to force the tool holder 15 to the right or into seating engagement with the end of the spindle 26. In this manner it is possible to maintain the squareness and concentricity of the implement 14 with the chuck 10, even though the actual length of contact between the two is relatively short. The vertical component of the force transmitted by the fingers 56, as mentioned previously, will grasp the end 66 so that the tool holder 15 is prevented from rotating as a result of the frictional force developed during the machining operation.

As mentioned previously, the greater the difference between the angles $\beta$ and $\alpha$, the greater the rate of change of the points of intersection of the lines of projection from the center line. Further, the greater the rate of change, the less it is necessary to extend the collet 28 in order to grasp the tool holder 15. However, if it should be desired to maintain the difference between $\beta$ and $\alpha$ within the locking range, then obviously there is a limitation as to the magnitude of such difference. It has been found that for a steel-on-steel construction, a good compromise of the rate of change and the locking angle requirements is a difference of 6 degrees.

It is to be noted that the angle $\alpha$ may increase slightly when the collet is extended. The change in angle, however, has little or no effect on the operation of the chuck.

In FIGURES 3 and 4 the chuck 10 is mounted within the annular support member 68 by means of the antifriction ball assemblies 70 and 72. The supporting ring 68 may be mounted on a base or frame of some suitable type (not shown) so that the chuck 10 may be rotated or driven with respect thereto by a suitable motor (not shown).

As mentioned previously, the workpiece or tool holder 15 is provided with the frusto-conical end 66 which diverges toward the end that is adapted to be grasped by the collet 28. The angle of divergence is preferably complementary to the angle of the surfaces 60 when the collet 28 is in its extended position.

The tool holder 15 is further provided with the annular portion 24 which is received in the recesses 20 and 21 and serves to properly position it with respect to the changer. The tool holder is provided with some means such as an axial bore 74 which extends at least part way through the holder 15 for receiving an implement or tool such as the end mill 76 or drill 78 in FIGURES 1 and 3, respectively. The tools may be secured against rotation in any suitable manner such as by a key and slot arrangement.

It is to be noted that the end 66 may be a spherical section instead of frusto-conical. In that instance the surfaces 60 should also be spherical sections.

It can now be seen that the tool holder 15 need merely be wiped or slid across the face 33 of the chuck 10 when the collet 28 is in its retracted position. After the tool 14 has been approximately centered on the spindle 26, then the collet may be extended so that the fingers 56 grasp the end 66. The tool changer 12, once the tool has been grasped by the chuck 10, may then be rotated with sufficient force to overcome the retentive power of the springs 22 so that the preceding tool may be returned to the magazine. After the operation with any specific tool has been completed, the tool changer 12 is then rotated until the tool is grasped in the recess 21 and then the collet 28 is retracted so that the tool is released. The released tool is then slid out of the centered position by the rotation of the changer 12 until the next tool in the recess 20 is approximately centered so that the operation can be completed.

Referring now to FIGURES 9, 10 and 11, there is shown another embodiment of the subject invention. While some the components utilized in the construction of this embodiment are similar to those used in the previous embodiments, different reference numerals will be used in order to avoid confusion.

The chuck is generally noted by the numeral 100 and includes a housing 102, which is adapted to be connected directly to a drive shaft as shown in FIGURE 9. The housing 102 consists of the outer shell 104, the inwardly turned flange 106 and the center tubular portion 108 which depends at one end from the flange 106 and is closed at the other end by the wall 110. The tubular portion 108 defines the bore 112. The inwardly turned flange 106 is provided with a plurality of apertures 114, which receive the bolts 116 for securing the housing to a drive shaft 118 of some suitable type.

At the forward end of the housing 102, an annular member 120 is secured to the shell 104 by means of the bolts 122. The inner surface 124 of the annular member 120 is tapered so that it converges toward, or in the direction of its exposed end.

The bore 112 of the tubular member 108 is adapted to receive the adjustable nut 126 by means of the threads 128. The adjustable nut 126 is provided with the inwardly turned flange 130, which defines the aperture 132. A connector shaft 134 extends through the aperture 132 and is connected at one end to the piston 136. At the other end the shaft 134 is provided with the pressure fitting 138, which is adapted to be connected to a source of high pressure (not shown). The pressure fitting 138 communicates with the bore 140, which extends the length of the shaft 134 to the end of the piston 136. The piston 136 is provided with the cylindrical portion 142, which is received within the bore 112 and cooperates with the wall 110 to form the chamber 144. The chamber 144 communicates with the bore 140, from which it receives the high pressure air through the fitting 138. The high pressure air, as can be seen from FIGURE 9, tends to force the piston 136 toward the right. The piston 136 is provided with the annular groove 146, in which is received the annular sealing member 148 to prevent leakage of air from the chamber 144.

A plurality of spring washers 150 are mounted in a back-to-back relationship on the shaft 134. The spring washers are confined between the flange 130 and the piston 136. The spring washers 150 tend to force the piston 136 to the left against the force of the pressure within the chamber 144.

As shown in FIGURES 9 and 10, the piston 136 is provided with the four radially projecting arms 152, which extend through the complementary slots 154 in the tubular portion 108. Each of the arms 152 is provided with a bore 156, which receives the bolts 157 for securing the ring member 158 thereto. A collet 160, including a plurality of fingers 162, is concentrically mounted on the ring member 158 and the radially projecting arms 152. As shown in FIGURE 11, the collet 160 includes a plurality of slots 164, which define the fingers 162 and extend approximately midway from the front of the collet. Each of the slots terminate in an elongate circumferential slot 166. A second group of slots 168 extend from the rear of the collet 160 and terminate short of the elongate slots 166. A still third group of slots 170 extend rearwardly from the elongate slots 166 but terminate short of the rear of the collet 160. The blind ends of the slots 168 and 170 are provided with the bores 172.

The fingers 162 are provided with the external tapered surface 174 which is complementary to the surface 124. As can be seen from the drawing, the external tapered surface 174 converges toward the forward end of the collet and is adjacent thereto. The collet 160 is also provided with the tapered surface 176, which converges toward and is adjacent to the forward end of the fingers. The surface 174 and 176 taper at the angles β and α, respectively, with the former being greater than the latter. As mentioned previously, in the preferred embodiments, the angles β and α are within the non-locking range, but that the difference between the two angles may be within the non-locking or locking ranges depending upon the results desired.

The collet 160 is provided with the inwardly extending annular shoulder 178, which is slidably received within the complementary annular groove 180 in the ring member 158. In this manner the piston 136 and the collet 160 are drivingly connected, so that movement of the former causes corresponding movement of the latter. When the collet 160 is moved forwardly, or to the right, the fingers 162 are forced readily inward, so as to grasp a tool holder 182. The contraction of the collet 160 forces the annular shoulder 178 into the groove 180. Conversely when the collet 160 is retracted, so that it expands to its normal position the annular shoulder 178 slides outwardly within the annular groove 180.

It is to be noted that the unique construction of the collet, as shown in FIGURE 11, at least substantially minimizes the changing of the angle α during the contraction and expansion of the collet. This result ensues from the fact that due to the arrangement of slots, the entire collet may expand and contract, rather than just the ends of the fingers.

The operation of this embodiment is substantially the same as described previously with respect to the embodiments shown in FIGURES 3 and 4. Briefly the operation consists of applying high pressure air to the chamber 144, so that the collet 160 is retracted so that the tool holder 182 may be placed in position. Then the connection with the source of pressure is interrupted, so that the spring washers 150 force the collet 160 forwardly thereby contracting the fingers 162 onto the holder. In all other respects, the operation of the embodiment shown in FIGURES 9, 10 and 11 is the same as previously described.

It is to be understood that while certain specific terminology has been used in the specification, these are merely by way of example and are in no manner to be considered as limitations. It will be apparent that certain modifications may be made within the scope of the claims without departing from the spirit of the invention.

What is claimed is:

1. A work holder adapted to hold a workpiece comprising a spindle having one end against which the workpiece is adapted to be seated, a collet composed of a plurality of fingers annularly spaced about said spindle and adapted to move longitudinally relative to said spindle, said collet having an inner tapered surface converging toward and adjacent the ends of said fingers, and means for forcing said fingers radially inwardly when said collet is moved forwardly relative to said spindle so that said tapered surface grasps the end of said workpiece to hold it against rotation relative to the spindle, the angle of said tapered surface when the fingers are in grasping position being substantially complementary to that of the end of said workpiece, said angle being such that the workpiece is forced rearwardly into seating position on said spindle.

2. A work holder adapted to receive a workpiece having a frusto-conical end comprising a spindle having one end against which the workpiece is adapted to be seated, a collet composed of a plurality of fingers annularly spaced about said spindle and adapted to move longitudinally relative to said spindle, said collet having an inner tapered surface converging toward and adjacent the ends of said fingers, and means for forcing said fingers radially inwardly when said collet is moved forwardly relative to said spindle so that said tapered surface grasps the frusto-conical end of said workpiece to hold it against rotation relative to the spindle, the angle of said tapered surface when said fingers are in grasping position being substantially complementary to that of said frusto-conical end of said workpiece, said angle being in the nonlocking range so that the work piece is forced rearwardly into seating position on said spindle.

3. A work holder adapted to receive a workpiece having a frusto-conical end comprising a spindle having one end against which the workpiece is adapted to be seated, a collet composed of a plurality of fingers annularly spaced about said spindle and adapted to move longitudinally relative to said spindle, said collet having an inner tapered annular surface converging toward and adjacent the ends of said fingers, means for forcing said fingers radially inwardly when said collet is moved forwardly relative to said spindle so that said tapered surfaces may grasp the frusto-conical end of said workpiece to hold it against rotation relative to the spindle, and means for moving said collet longitudinally relative to said spindle so that the ends of said fingers project beyond said end of said spindle when extended and are substantially flush therewith when retracted, the angle of said tapered surfaces when the fingers are in grasping position being substantially complementary to that of said frusto-conical end of said workpiece, said angle being in the non locking range so that the workpiece is forced rearwardly into seating position on said spindle.

4. A work holder adapted to receive a workpiece having a frusto-conical end comprising a spindle having one end against which the workpiece is adapted to be seated, a collet composed of a plurality of fingers annularly spaced about said spindle and adapted to move longitudinally relative to said spindle, said collet having an inner tapered annular surface converging toward and adjacent the ends of said fingers, means for reciprocating said collet longitudinally relative to said spindle so that said ends of said fingers project beyond said end of said spindle when extended and are substantially flush therewith when retracted, an annular member longitudinally fixed with respect to said spindle, circumventing said fingers and in closely spaced relationship therewith, said annular member having a surface tapering inwardly toward said one end of said spindle, said fingers having a tapered surface complementary to that of said annular member and normally in engagement therewith, whereby forward movement of said collet causes said fingers to radially contract so that said inner extending tapered surfaces on said fingers grasp the frusto-conical end of said workpiece to hold it against rotation relative to said spindle, the angle of said inner tapered annular surface on said collet when in extended position being in the nonlocking range and complementary to that of said frusto-conical end of said workpiece so that said workpiece is forced into seating position.

5. A work holder according to claim 4 in which said reciprocating means includes spring means for movement in one direction and fluid pressure means for movement in the other direction.

6. A tool chucking device adapted to receive a tool holder having a frusto-conical end comprising a spindle having one end against which the tool holder is adapted to be seated, a collet composed of a plurality of fingers annularly spaced about said spindle and adapted to move longitudinally relative to said spindle, said collet having a plurality of annularly arranged tapered surfaces on said fingers converging toward and adjacent the ends thereof, means for reciprocating said collet longitudinally relative to said spindle so that said ends of said fingers and said inner tapered annular surfaces project beyond said end of said spindle when extended and said ends are substantially flush therewith when retracted, an annular member longitudinally fixed with respect to said spindle circumventing said fingers and in closely spaced relationship therewith, said annular member having an annular surface tapering inwardly toward said one end of said spindle, said fingers having a tapered surface complementary to that of said annular member and normally in engagement therewith, whereby forward movement of said collet causes said fingers to radially contract so that said inner extending tapered surfaces on said fingers grasp the frusto-conical end of the tool holder to hold it against rotation relative to said spindle, the angle of said inner tapered surface on said fingers and the angle of the tapered surface on said annular member both being within the nonlocking range with the latter being greater than the former.

7. A tool chucking device according to claim 6 in which the angular difference between said tapered surfaces is within the locking range.

8. A tool chucking device according to claim 6 in which the angular difference between said tapered surfaces is within the nonlocking range.

9. The combination comprising a tool chucking device and a tool holder adapted to be received and nonrotatably fixed therein, said tool chucking device including a spindle, a collet coaxial with said spindle and adapted to be reciprocated longitudinally between a retracted and an extended position in which the end of said collet projects beyond the end of said spindle, said collet having an inner tapered surface converging toward and adjacent its said end, and means for causing said collet to contract radially inward when it is moved forwardly from said retracted position to said extended position, said tool holder having a frusto-conical portion complementary to said inner tapered surface of said collet, said frusto-conical portion being received within said inner tapered surface so that when said collet is contracted radially inward, the tool holder is fixed against rotary movement.

10. The combination according to claim 9 in which the angle of said inner tapered surface is within the nonlocking range so that said frusto-conical portion of said tool holder is forced into seating engagement with the end of said spindle.

11. In a workholder adapted to hold a work piece for purposes of driving the same the combination comprising a spindle having one end against which the work piece is adapted to be seated, a collet annularly mounted on said spindle and being movable longitudinally relative to said spindle between a retracted position and an extended position, said one end being positioned relative to said collet when said collet is in said retracted position so that said work piece may be moved across said one end without interference from said collet, said collet extending forwardly of said one end when in said extended position for purposes of grasping a tool seated on said one end.

12. In a workholder adapted to hold a work piece for purposes of driving the same, the invention comprising a spindle having one end against which the work piece is adapted to be seated, a collet annularly mounted on said spindle and being movable longitudinally relative to said spindle between a retracted position and an extended position, said one end being positioned relative to said collet when said collet is in its retracted position so that said work piece may be moved across said one end without interference from said collet, said collet extending forwardly of said one end when in its extended position, said collet including means for grasping said work piece when in said extended position.

13. In a workholder adapted to hold a work piece for purposes of driving the same, the invention comprising a spindle having one end against which the work piece is adapted to be seated, a collet annularly mounted on said spindle and being movable longitudinally relative to said spindle between a retracted position and an extended position, said one end being positioned relative to said collet when said collet is in its retracted position so that said work piece may be moved across said one end without interference from said collet, said collet extending forwardly of said one end when in its extended position, said collet including means for grasping said work piece when in said extended position, and means for driving said collet between said extended and said retracted positions.

14. In a workholder adapted to hold a work piece for purposes of driving the same, the combination comprising a spindle having a substantially planar end against which the work piece is adapted to be seated, a collet annularly mounted on said spindle and being movable relative to said spindle between a retracted position and an extended position, said planar end being at least coplanar with the end of said collet when said collet is in said retracted position so that said work piece may be moved across said planar end without interference from said collet, said collet extending forwardly of said planar end when in said extended position for purposes of grasping a tool seated on said one end.

References Cited by the Examiner
UNITED STATES PATENTS

| 971,663 | 10/10 | Carlson | 279—51 |
| 1,085,146 | 1/14 | McClellan | 279—4 |
| 1,390,942 | 3/20 | Phillips | 279—51 |
| 1,509,997 | 9/24 | Fry | 279—4 |
| 1,680,631 | 8/28 | Palaith | 279—51 |
| 2,359,286 | 10/44 | Billger | 279—51 |
| 2,387,412 | 10/45 | Schnable | 90—11 |
| 2,394,555 | 2/46 | Mann | 279—65 |
| 2,672,789 | 3/54 | Cross | 90—11 |
| 2,783,527 | 3/57 | Davidson | 29—103 |
| 2,860,547 | 11/58 | Stephan | 279—89 |
| 2,867,031 | 1/59 | Briney | 29—105 |
| 2,911,765 | 11/59 | Studler | 279—4 |
| 2,912,249 | 11/59 | Eckold | 279—93 |

FOREIGN PATENTS 562,094  6/44  Great Britain.

ROBERT C. RIORDON, *Primary Examiner.*
THOMAS E. BEALL, KARL J. ALBRECHT,
*Examiners.*

UNITED STATES PATENT OFFICE
CERTIFICATE OF CORRECTION

Patent No. 3,171,663　　　　　　　　　　　　　　　　March 2, 1965

James A. Stark

It is hereby certified that error appears in the above numbered patent requiring correction and that the said Letters Patent should read as corrected below.

Column 2, line 20, for "drils" read -- drills --; line 3: after "perspective" insert -- view --; column 4, line 20, for "raidal" read -- radial --; column 6, line 28, after "some" insert -- of --; column 7, line 25, for "surface" read -- surfaces --; line 39, for "readily" read -- radially --; column 10, line 49, for "1,390,942" read -- 1,390,924 --.

Signed and sealed this 1st day of June 1965.

(SEAL)
Attest:

ERNEST W. SWIDER　　　　　　　　　　　　　　　　EDWARD J. BRENNE
Attesting Officer　　　　　　　　　　　　　　　　Commissioner of Patents